(12) United States Patent
Ishikawa et al.

(10) Patent No.: US 7,362,597 B2
(45) Date of Patent: Apr. 22, 2008

(54) AC VOLTAGE GENERATING APPARATUS AND MOTIVE POWER OUTPUTTING APPARATUS

(75) Inventors: Tetsuhiro Ishikawa, Nishikamo-gun (JP); Satoshi Fujii, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 148 days.

(21) Appl. No.: 10/583,279

(22) PCT Filed: Nov. 24, 2004

(86) PCT No.: PCT/JP2004/017830

§ 371 (c)(1),
(2), (4) Date: Jun. 16, 2006

(87) PCT Pub. No.: WO2005/069471

PCT Pub. Date: Jul. 28, 2005

(65) Prior Publication Data

US 2007/0171689 A1    Jul. 26, 2007

(30) Foreign Application Priority Data

Jan. 13, 2004    (JP)    .............................. 2004-005604

(51) Int. Cl.
  *H02M 7/00*    (2006.01)
(52) U.S. Cl. ........................................ 363/71; 363/165
(58) Field of Classification Search ................. 363/65, 363/71, 131, 149, 152, 163, 164, 165; 318/801, 318/809

See application file for complete search history.

(56) References Cited

U.S. PATENT DOCUMENTS

| 5,142,468 | A |  | 8/1992 | Nerem |
| 6,710,495 | B2 | * | 3/2004 | Lipo et al. .................. 318/809 |
| 6,801,019 | B2 | * | 10/2004 | Haydock et al. .............. 322/17 |
| 7,109,681 | B2 | * | 9/2006 | Baker et al. .................. 363/71 |
| 2002/0191423 | A1 |  | 12/2002 | Odachi et al. |

FOREIGN PATENT DOCUMENTS

EP    1 201 485 A1    5/2002

(Continued)

OTHER PUBLICATIONS

Sul et al.; "An Integral Battery Charger for Four-Wheel Drive Electric Vehicle;" *IEEE Transactions on Industry Applications*; vol. 31, No. 5; pp. 1096-1099; Sep./Oct. 1995.

*Primary Examiner*—Y. J. Han
(74) *Attorney, Agent, or Firm*—Oliff & Berridge, PLC

(57) ABSTRACT

A motive power outputting apparatus includes motor generators, inverters, and a transformer. The motor generator includes a three-phase coil, and the motor generator includes a three-phase coil. The inverter allows an in-phase AC current to pass through an U-phase coil, a V-phase coil and a W-phase coil of the three-phase coil. The inverter allows an in-phase AC current, which has a phase being inverted relative to that of the in-phase AC current passing through the three-phase coil, to pass through an U-phase coil, a V-phase coil and a W-phase coil of the three-phase coil. The transformer converts an AC voltage generated in a primary coil and outputs a commercial-power-source AC voltage to terminals.

15 Claims, 9 Drawing Sheets

FOREIGN PATENT DOCUMENTS

| | | |
|---|---|---|
| JP | A-04-295202 | 10/1992 |
| JP | A-08-126121 | 5/1996 |
| JP | A-10-117403 | 5/1998 |
| JP | A-10-225014 | 8/1998 |
| JP | A-2000-324857 | 11/2000 |
| JP | A-2002-171606 | 6/2002 |

* cited by examiner

AC VOLTAGE GENERATING APPARATUS AND MOTIVE POWER OUTPUTTING APPARATUS

TECHNICAL FIELD

The present invention relates to an AC (Alternating Current) voltage generating apparatus that generates an AC voltage using two three-phase coils, and to a motive power outputting apparatus that generates an AC voltage using two three-phase coils.

BACKGROUND ART

Japanese Patent Laying-Open No. 8-126121, Japanese Patent Laying-Open No. 2002-171606, Japanese Patent Laying-Open No. 2000-324857, Japanese Patent Laying-Open No. 10-117403, Japanese Patent Laying-Open No. 10-225014, and Japanese Patent Laying-Open No. 4-295202 disclose on-board charging apparatuses. For example, the on-board charging apparatus disclosed in Japanese Patent Laying-Open No. 8-126121 includes three-phase coils CA, CB, inverters IA, IB, and a battery. A commercial power source is connected between a neutral point of three-phase coil CA and a neutral point of three-phase coil CB.

Inverters IA and IB are provided corresponding to three-phase coils CA and CB, respectively, and connected to three-phase coils CA and CB, respectively. Inverters IA and IB are connected in parallel to the battery.

When charging the battery, inverter IA is controlled to allow an equal current to pass through each of the three coils of three-phase coil CA, while inverter IB is controlled to allow a current, which is equal to that passing through the three coils of three-phase coil CA, to pass through each of the three coils of three-phase coil CB. Thus, inverters IA and IB converts an AC voltage from the commercial power source to a DC voltage, and supplies the battery.

However, Japanese Patent Laying-Open No. 8-126121 discloses only the configuration for charging a battery using a commercial power source, and therefore an AC voltage as a commercial power source can hardly be generated using two three-phase coils.

DISCLOSURE OF THE INVENTION

An object of the present invention is to provide an AC voltage generating apparatus that generates an AC voltage using two three-phase coils.

Another object of the present invention is to provide a motive power outputting apparatus that generates an AC voltage using two three-phase coils.

According to the present invention, an AC voltage generating apparatus includes: first and second three-phase coils; first and second current supplying circuits; and a voltage converter. The first current supplying circuit allows a first AC current having a prescribed frequency to pass through the first three-phase coil. The second current supplying circuit allows a second AC current, which has the prescribed frequency and a phase that is inverted relative to the phase of the first AC current, to pass through the second three-phase coil. The voltage converter is connected between a first neutral point of the first three-phase coil and a second neutral point of the second three-phase coil for converting an AC voltage generated between the first neutral point and the second neutral point to output an AC voltage having the prescribed frequency.

Preferably, the first current supplying circuit includes a first inverter and first control means. The first inverter is connected to the first three-phase coil. The first control means controls the first inverter to allow the first AC current to pass through the first three-phase coil. The second current supplying circuit includes a second inverter and second control means. The second inverter is connected to the second three-phase coil. The second control means controls the second inverter to allow the second AC current to pass through the second three-phase coil.

Preferably, the prescribed frequency is determined by a switching frequency in the first and second inverters.

Preferably, the first three-phase coil is formed of first to third coils. The second three-phase coil is formed of fourth to sixth coils. The first inverter includes first to third arms provided corresponding to the first to third coils. The second inverter includes fourth to sixth arms provided corresponding to the fourth to sixth coils. The first control means switching-controls at least one of the first to third arms at the prescribed frequency to allow a first in-phase AC current to pass through at least one of the first to third coils. The second control means switching-controls at least one of the fourth to sixth arms at the prescribed frequency to allow a second in-phase AC current having a phase being inverted relative to a phase of the first in-phase AC current to pass through at least one of the fourth to sixth coils.

Preferably, the first three-phase coil is formed of first to third coils. The second three-phase coil is formed of fourth to sixth coils. The first inverter includes first to third arms provided corresponding to the first to third coils. The second inverter includes fourth to sixth arms provided corresponding to the fourth to sixth coils. The first control means controls the first inverter to convert an AC voltage generated by the first to third coils to a DC voltage. The second control means switching-controls at least one of the fourth to sixth arms to allow an in-phase AC current having a phase being inverted relative to a phase of an AC current generated by the first to third coils to pass through at least one of the fourth to sixth coils.

Preferably, the prescribed frequency is determined by a frequency at which a duty for switching-controlling the first and second inverters is changed.

Preferably, the first three-phase coil is formed of first to third coils. The second three-phase coil is formed of fourth to sixth coils. The first inverter includes first to third arms provided corresponding to the first to third coils. The second inverter includes fourth to sixth arms provided corresponding to the fourth to sixth coils. The first control means switching-controls the first to third arms by changing a first duty of the first to third arms according to a first curve that changes at the prescribed frequency. The second control means switching-controls the fourth to sixth arms by changing a second duty of the fourth to sixth arms according to a second curve that has a phase being inverted relative to a phase of the first curve.

According to the present invention, a motive power outputting apparatus includes first and second motor generators, first and second inverters, first and second control means, and a voltage converter. The first motor generator includes a first three-phase coil as a stator coil. The second motor generator includes a second three-phase coil as a stator coil. The first inverter is connected to the first three-phase coil. The second inverter is connected to the second three-phase coil. The first control means controls the first inverter to allow a first AC current having a prescribed frequency to pass through the first three-phase coil. The second control means controls the second inverter to allow a second AC current having a phase being inverted relative to a phase of the first AC current to pass through the second three-phase coil. The voltage converter is connected between a first neutral point of the first three-phase coil and a second neutral point of the second three-phase coil for converting an AC voltage generated between the first neutral point and the second neutral point to output an AC voltage having the prescribed frequency.

Preferably, the prescribed frequency is determined by a switching frequency in the first and second inverters.

Preferably, the first three-phase coil is formed of first to third coils. The second three-phase coil is formed of fourth to sixth coils. The first inverter includes first to third arms provided corresponding to the first to third coils. The second inverter includes fourth to sixth arms provided corresponding to the fourth to sixth coils. When the first and second motor generators are stopped, the first control means switching-controls at least one of the first to third arms at the prescribed frequency to allow a first in-phase AC current to pass through at least one of the first to third coils. The second control means switching-controls at least one of the fourth to sixth arms at the prescribed frequency to allow a second in-phase AC current having a phase being inverted relative to a phase of the first in-phase AC current to pass through at least one of the fourth to sixth coils.

Preferably, the first three-phase coil is formed of first to third coils. The second three-phase coil is formed of fourth to sixth coils. The first inverter includes first to third arms provided corresponding to the first to third coils. The second inverter includes fourth to sixth arms provided corresponding to the fourth to sixth coils. In a regenerative mode of the first motor generator, the first control means controls the first inverter to convert an AC voltage generated by the first to third coils to a DC voltage, and the second control means switching-controls at least one of the fourth to sixth arms to allow an in-phase AC current having a phase being inverted relative to a phase of an AC current generated by the first to third coils to pass through at least one of the fourth to sixth coils.

Preferably, the prescribed frequency is determined by a frequency at which a duty for switching-controlling the first and second inverters is changed.

Preferably, the first three-phase coil is formed of first to third coils. The second three-phase coil is formed of fourth to sixth coils. The first inverter includes first to third arms provided corresponding to the first to third coils. The second inverter includes fourth to sixth arms provided corresponding to the fourth to sixth coils. In a powering mode of the first and second motor generators, the first control means switching-controls the first to third arms by changing a first duty of the first to third arms according to a first curve that changes at the prescribed frequency, and the second control means switching-controls the fourth to sixth arms by changing a second duty of the fourth to sixth arms according to a second curve that has a phase being inverted relative to a phase of the first curve.

Preferably, the first motor generator is coupled to an internal combustion engine of a vehicle. The second motor generator is coupled to a driving wheel of the vehicle.

Preferably, each of the first and second motor generators is coupled to a driving wheel of a vehicle.

In the AC voltage generating apparatus according to the present invention, two AC currents having an inverted phase relative to each other are allowed to pass through the two three-phase coils, respectively. The voltage converter converts an AC voltage generated between the neutral points of the two three-phase coils and outputs an AC voltage having a prescribed frequency.

Therefore, according to the present invention, an AC voltage can be generated using the two three-phase coils. Additionally, an arbitrary AC voltage can be obtained from the neutral points of the two three-phase coils.

In the motive power outputting apparatus according to the present invention, two AC currents having an inverted phase relative to each other are respectively allowed to pass through the two three-phase coils respectively included in the two motor generators. The voltage converter is connected between the neutral points of the two three-phase coils of the two motor generators, and converts an AC voltage generated between the neutral points of the two three-phase coils and outputs an AC voltage having a prescribed frequency.

Therefore, according to the present invention, an AC voltage can be generated using the two three-phase coils included in the two motor generators. Additionally, an arbitrary AC voltage can be obtained from the neutral points of the two three-phase coils included in the two motor generators. Further, a dedicated inverter for generating an AC voltage is not required. Still further, generation of an AC voltage can be shared by the two inverters.

BEST MODES FOR CARRYING OUT THE INVENTION

Figure 1:
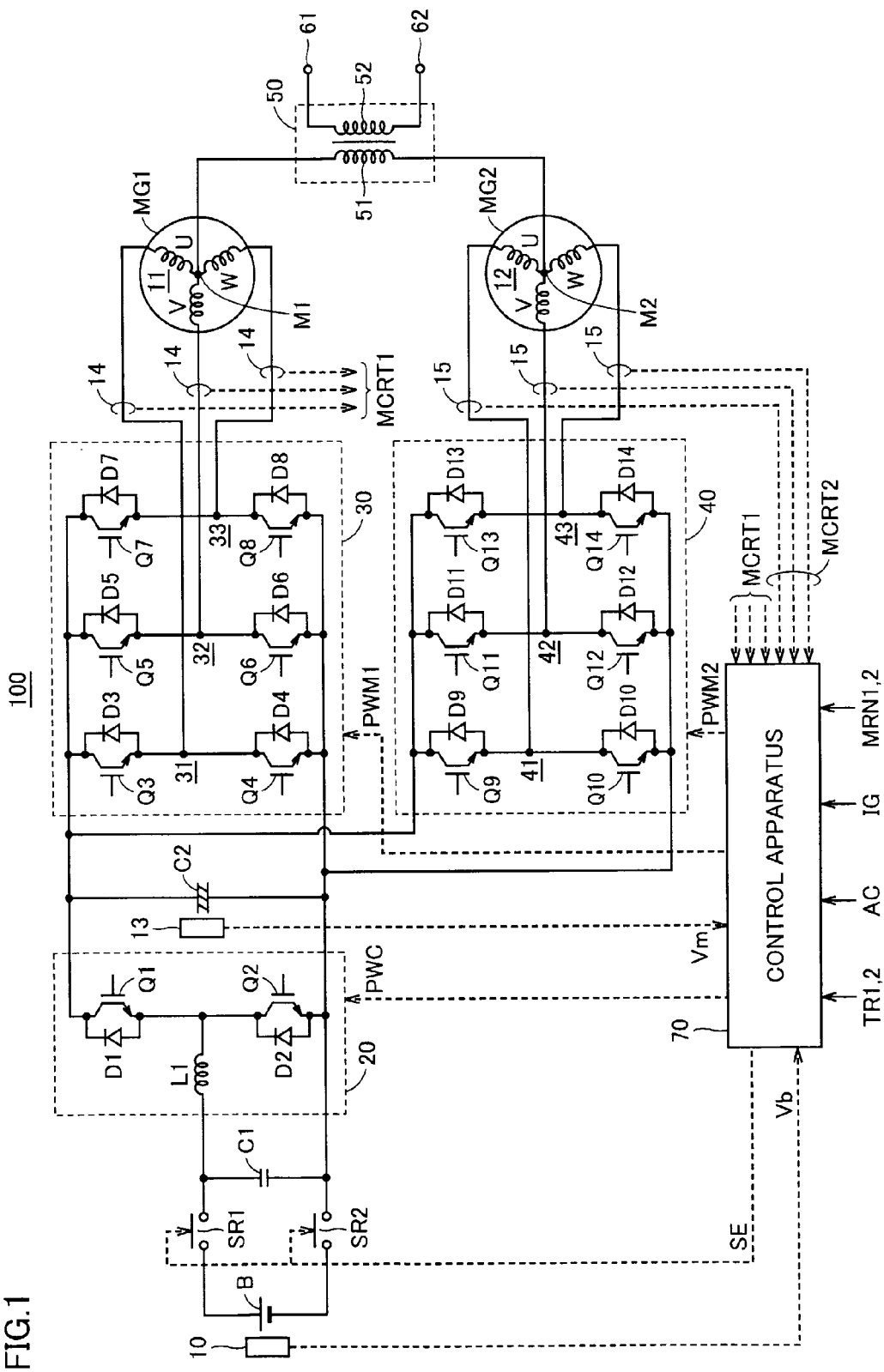
FIG. 1 is a schematic block diagram of a motive power outputting apparatus according to an embodiment of the present invention.

Referring to the drawings, an embodiment of the present invention will be described in detail. In the drawings, the identical or corresponding parts are denoted by the identical reference characters, and description thereof will not be repeated.

FIG. 1 is a schematic block diagram of a motive power outputting apparatus according to the embodiment of the present invention. Referring to FIG. 1, a motive power outputting apparatus 100 according to the embodiment of the present invention includes a battery B, voltage sensors 10, 13, system relays SR1, SR2, capacitors C1, C2, current sensors 14, 15, a boost converter 20, inverters 30, 40, a transformer 50, terminals 61, 62, a control apparatus 70, and motor generators MG1, MG2.

Motive power outputting apparatus 100 is mounted on a hybrid vehicle, for example. Motor generator MG1 is assembled into the hybrid engine so as to have a function of a generator driven by an engine, and also to operate as an electric motor to the engine, e.g., as the one capable of starting the engine, for example. Motor generator MG2 is a drive motor for generating torque for driving the driving wheels of the hybrid vehicle.

Motor generator MG1 includes a three-phase coil 11 as a stator coil, and motor generator MG2 includes a three-phase coil 12 as a stator coil.

Boost converter 20 includes a reactor L1, NPN transistors Q1, Q2, and diodes D1, D2. Reactor L1 has its one end connected to a power supply line of DC power source B, and has its other end connected to an intermediate point between NPN transistor Q1 and NPN transistor Q2, i.e., between the emitter of NPN transistor Q1 and the collector of NPN transistor Q2. NPN transistors Q1 and Q2 are serially connected between the power supply line and the earth line. NPN transistor Q1 has its collector connected to the power supply line of inverters 30 and 40, while NPN transistor Q2 has its emitter connected to the earth line. Diodes D1, D2 are respectively arranged between collectors and emitters of NPN transistors Q1, Q2, to allow currents to flow from the emitter side to the collector side.

Inverter 30 is formed of a U-phase arm 31, a V-phase arm 32 and a W-phase arm 33. U-phase arm 31, V-phase arm 32, and W-phase arm 33 are provided in parallel between the power supply line of inverter 30 and the earth line.

U-phase arm 31 is formed of serially connected NPN transistors Q3 and Q4. V-phase arm 32 is formed of serially connected NPN transistors Q5 and Q6, and W-phase arm 33 is formed of serially connected NPN transistors Q7 and Q8. Diodes D3-D8 are respectively connected between the collectors and the emitters of NPN transistors Q3-Q8, to allow currents to flow from the emitter side to the collector side.

The intermediate point of each phase arm of inverter 30 is connected to each phase end of each phase coil of three-phase coil 11 included in motor generator MG1. Specifically, motor generator MG1 is a three-phase permanent magnet motor, in which respective one ends of three coils of U, V and W-phases are connected in common to neutral point M1, while the other end of U-phase coil is connected to the intermediate point of NPN transistors Q3 and Q4, the other end of V-phase coil is connected to the intermediate point of NPN transistors Q5 and Q6, and the other end of W-phase coil is connected to the intermediate point of NPN transistors Q7 and Q8.

Inverter 40 is connected to opposing ends of capacitor C2 in parallel to inverter 30. Inverter 40 is formed of a U-phase arm 41, a V-phase arm 42 and a W-phase arm 43. U-phase arm 41, V-phase arm 42, and W-phase arm 43 are provided in parallel between the power supply line of inverter 40 and the earth line.

U-phase arm 41 is formed of serially connected NPN transistors Q9 and Q10. V-phase arm 42 is formed of serially connected NPN transistors Q11 and Q12, and W phase arm 43 is formed of serially connected NPN transistors Q13 and Q14. NPN transistors Q9-Q14 correspond to NPN transistors Q3-Q8, respectively. Specifically, inverter 40 has the same configuration as inverter 30. Diodes D9-D14 are respectively connected between the collectors and the emitters of NPN transistors Q9-Q14, to allow currents to flow from the emitter side to the collector side.

The intermediate point of each phase arm of inverter 40 is connected to each phase end of each phase coil of three-phase coil 12 included in motor generator MG2. Specifically, motor generator MG2 is also a three-phase permanent magnet motor, in which respective one ends of three coils of U, V and W-phases are connected in common to neutral point M2, while the other end of U-phase coil is connected to the intermediate point of NPN transistors Q9 and Q10, the other end of V-phase coil is connected to the intermediate point of NPN transistors Q11 and Q12, and the other end of W-phase coil is connected to the intermediate point of NPN transistors Q13 and Q14.

Battery B is formed of a secondary battery such as a Nickel-Metal Hydride battery and a lithium ion battery. Voltage sensor 10 detects a battery voltage Vb outputted from battery B, and outputs thus detected battery voltage Vb to control apparatus 70. System relays SR1, SR2 are turned on/off by a signal SE from control apparatus 70. More specifically, system relays SR1, SR2 are turned on by signal SE of H (logical high) level, and turned off by signal SE of L (logical low) level. Capacitor C1 smoothes a DC voltage supplied from battery B, and supplies the smoothed DC voltage Vb to boost converter 20.

Boost converter 20 increases the DC voltage supplied from capacitor C1 and supplies it to capacitor C2. More specifically, boost converter 20 receives a signal PWC from control apparatus 70, and increases the DC voltage in accordance with a period during which NPN transistor Q2 is turned on by signal PWC, and supplies it to capacitor C2. Here, NPN transistor Q1 is turned off by signal PWC. Additionally, boost converter 20 decreases the DC voltage supplied from inverter 30 and/or inverter 40 via capacitor C2 in accordance with signal PWC from control apparatus 70 and charges battery B.

Capacitor C2 smoothes DC voltage from boost converter 20, and supplies the smoothed DC voltage to inverters 30, 40. Voltage sensor 13 detects the voltage between both ends of capacitor C2, i.e., an output voltage Vm of boost converter 20 (corresponding to the input voltage of inverters 30, 40: the same holds true for the following), and outputs thus detected output voltage Vm to control apparatus 70.

When supplied with the DC voltage from capacitor C2, inverter 30 converts the DC voltage to an AC voltage based on a signal PWM1 from control apparatus 70 to drive motor generator MG1. Thus, motor generator MG1 is driven to produce the torque specified by a torque instruction value TR1. Further, in a regenerative braking mode of a hybrid vehicle equipped with motive power outputting apparatus 100, inverter 30 converts an AC voltage generated by motor generator MG1 to a DC voltage based on a signal PWM1 from control apparatus 70, and supplies thus converted DC voltage to boost converter 20 via capacitor C2. As used herein, the regenerative braking includes a braking operation associated with the regeneration of electricity where the driver of the hybrid vehicle operates a foot brake, or deceleration (or stopping acceleration) of the vehicle associated with regeneration of electricity where the driver does not operate the foot brake but turns an accelerator pedal off.

Further, in accordance with signal PWM1 from control apparatus 70, inverter 30 drives motor generator MG1 through a method described later, so that transformer 50 can output commercial-power-source-AC-voltage VAC from terminals 61 and 62.

When supplied with the DC voltage from capacitor C2, inverter 40 converts the DC voltage to an AC voltage based on a signal PWM2 from control apparatus 70 to drive motor generator MG2. Thus, motor generator MG2 is driven to produce the torque specified by a torque instruction value TR2. Further, in the regenerative braking mode of a hybrid vehicle equipped with motive power outputting apparatus 100, inverter 40 converts an AC voltage generated by motor generator MG2 to a DC voltage based on a signal PWM2 from control apparatus 70, and supplies thus converted DC voltage to boost converter 20 via capacitor C2.

Further, in accordance with signal PWM2 from control apparatus 70, inverter 40 drives motor generator MG2 through a method described later, so that transformer 50 can output commercial-power-source-AC-voltage VAC from terminals 61 and 62.

Current sensor 14 detects a motor current MCRT1 flowing through motor generator MG1, and outputs thus detected motor current MCRT1 to control apparatus 70. Current sensor 15 detects a motor current MCRT2 flowing through motor generator MG2, and outputs thus detected motor current MCRT2 to control apparatus 70.

Transformer 50 includes a primary coil 51 and a secondary coil 52. Primary coil 51 is connected between neutral point M1 of three-phase coil 11 included in motor generator MG1 and neutral point M2 of three-phase coil 12 included in motor generator MG2. Transformer 50 converts an AC voltage generated between neutral point M1 of motor generator MG1 and neutral point M2 of motor generator MG2 to a commercial-power-source-AC-voltage VAC, and outputs it from terminals 61 and 62.

Terminals 61 and 62 are terminals for a commercial power source, to which a power supply plug of an electric appliance, a plug of a home emergency power source or the like is connected.

Control apparatus 70 generates signal PWC for driving boost converter 20 according to the method described later, based on torque instruction values TR1, 2 and motor rotation numbers MRN1, 2 inputted from an externally provided ECU (Electrical Control Unit), battery voltage Vb from voltage sensor 10, and output voltage Vm from voltage sensor 13, and outputs thus generated signal PWC to boost converter 20.

Signal PWC is a signal for driving boost converter 20 when boost converter 20 converts DC voltage from capacitor C1 to output voltage Vm. Control apparatus 70 generates signal PWC for driving boost converter 20 when boost converter 20 converts a DC voltage to output voltage Vm, in order to feedback control output voltage Vm such that output voltage Vm attains voltage instruction Vdc_com as instructed. A method for generating signal PWC will be described later.

Further, control apparatus 70 generates signal PWM1 for driving motor generator MG1 through the method described later, based on voltage Vm, motor current MCRT1 and torque instruction value TR1, and outputs thus generated signal PWM1 to inverter 30. Still further, control apparatus 70 generates signal PWM2 for driving motor generator MG2 through the method described later, based on voltage Vm, motor current MCRT2 and torque instruction value TR2, and outputs thus generated signal PWM2 to inverter 40.

Still further, control apparatus 70 generates signals PWM1, PWM2 for controlling inverters 30, 40 so as to generate commercial-power-source-AC-voltage VAC through the method described later, based on a signal IG from an ignition key and a signal AC from external ECU.

Still further, control apparatus 70 generates signal SE for turning on/off system relays SR1, SR2, and outputs it to system relays SR1, SR2.

Figure 2:
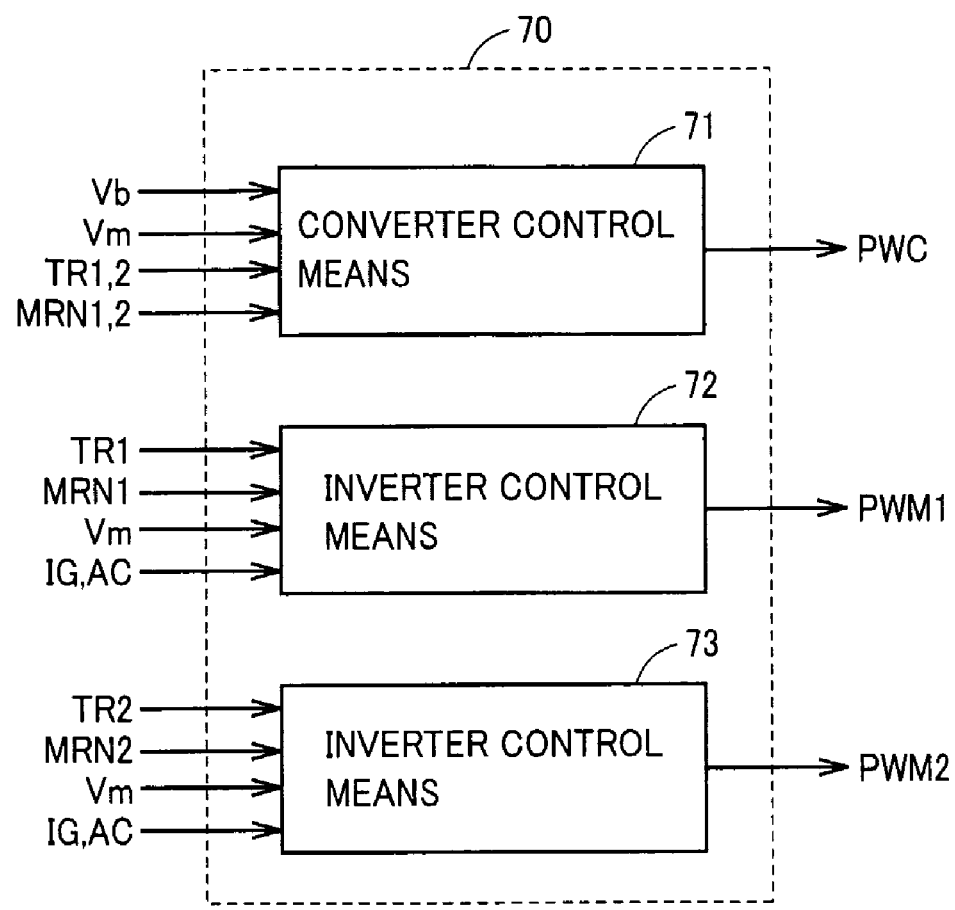
FIG. 2 is a functional block diagram of a control apparatus shown in FIG. 1.

FIG. 2 is a functional block diagram of control apparatus 70 shown in FIG. 1. Referring to FIG. 2, control apparatus 70 includes converter control means 71 and inverter control means 72, 73. Converter control means 71 generates signal PWC for turning on/off NPN transistors Q1, Q2 of boost converter 20 according to the method described later, based on battery voltage Vb, voltage Vm, torque instruction values TR1, 2, and motor rotation numbers MRN 1, 2. Then, converter control means 71 outputs thus generated signal PWC to boost converter 20.

Inverter control means 72 generates signal PWM1 for driving inverter 30 based on torque instruction value TR1, motor rotation number MRN1 and voltage Vm, and outputs thus generated signal PWM1 to inverter 30. Further, inverter control means 72 determines a driving state of motor generator MG1 based on torque instruction value TR1 and motor rotation number MRN1 in accordance with signals IG, AC. Inverter control means 72 then generates signal PWM1 for driving inverter 30 to generate commercial-power-source-AC-voltage VAC in accordance with the driving state of motor generator MG1 and outputs it to inverter 30.

Inverter control means 73 generates signal PWM2 for driving inverter 40 based on torque instruction value TR2, motor rotation number MRN2 and voltage Vm according to the same method as inverter control means 72, and outputs thus generated signal PWM2 to inverter 40. Further, inverter control means 73 determines a driving state of motor generator MG2 based on torque instruction value TR2 and motor rotation number MRN2 in accordance with signals IG, AC. Inverter control means 73 then generates signal PWM2 for driving inverter 40 to generate commercial-power-source-AC-voltage VAC in accordance with the driving state of motor generator MG2 and outputs it to inverter 40.

Figure 3:
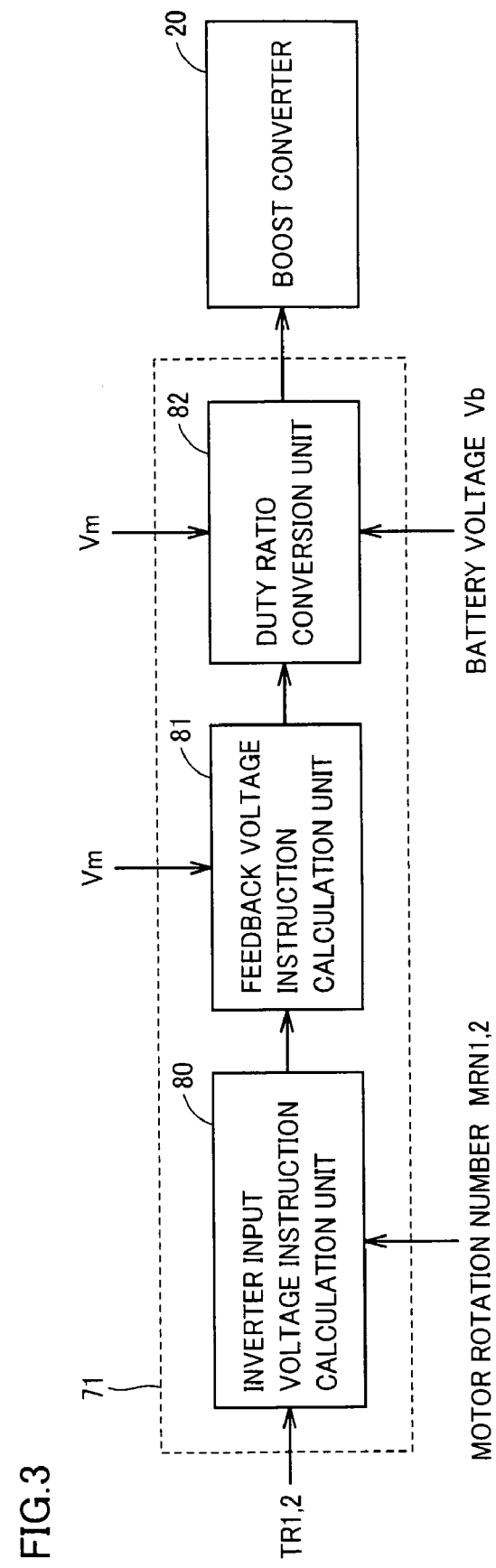
FIG. 3 is a functional block diagram of converter control means shown in FIG. 2.

FIG. 3 is a functional block diagram of converter control means 71 shown in FIG. 2. Referring to FIG. 3, converter control means 71 includes an inverter input voltage instruction calculation unit 80, a feedback voltage instruction calculation unit 81, and a duty ratio conversion unit 82.

Inverter input voltage instruction calculation unit 80 calculates the optimum value of inverter input voltage (target value), i.e., voltage instruction Vdc_com based on torque instruction values TR1, 2 and motor rotation numbers MRN1, 2, and outputs thus calculated voltage instruction Vdc_com to feedback voltage instruction calculation unit 81.

Feedback voltage instruction calculation unit 81 calculates, based on output voltage Vm of boost converter 20 from voltage sensor 13 and voltage instruction Vdc_com from inverter input voltage instruction calculation unit 80, feedback voltage instruction Vdc_com_fb for setting output voltage Vm to voltage instruction Vdc_com, and outputs thus calculated feedback voltage instruction Vdc_com_fb to duty ratio conversion unit 82.

Duty ratio conversion unit 82 calculates, based on battery voltage Vb from voltage sensor 10 and feedback voltage instruction Vdc_com_fb from feedback voltage instruction calculation unit 81, the duty ratio for setting output voltage Vm from voltage sensor 13 to feedback voltage instruction Vdc_com_fb from feedback voltage instruction calculation unit 81, and generates signal PWC for turning on/off NPN transistors Q1, Q2 of boost converter 20 based on thus calculated duty ratio. Then, duty ratio conversion unit 82 outputs thus generated signal PWC to NPN transistors Q1, Q2 of boost converter 20.

It should be noted that, if the on-duty of the lower NPN transistor Q2 of boost converter 20 is increased, then the electricity storage of reactor L1 increases, and hence output of higher voltage can be obtained. On the other hand, if the on-duty of upper NPN transistor Q1 is increased, then the voltage of the power supply line decreases. Accordingly, by controlling the duty ratio of NPN transistors Q1, Q2, the voltage of the power supply line can be controlled to any voltage at least at the output voltage of battery B.

Figure 4:
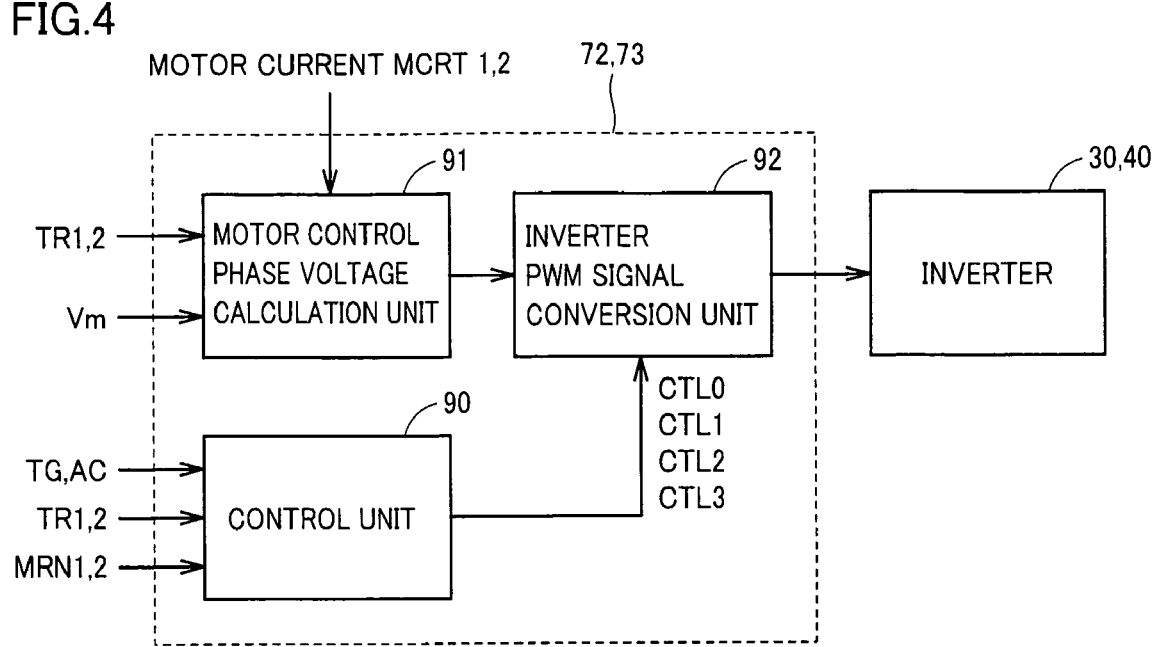
FIG. 4 is a functional block diagram of inverter control means shown in FIG. 2.

FIG. 4 is a functional block diagram of inverter control means 72, 73 shown in FIG. 2. Referring to FIG. 4, inverter control means 72, 73 each include a control unit 90, a motor control phase voltage calculation unit 91, and an inverter PWM signal conversion unit 92.

Control unit 90 receives signal IG from the ignition key, and receives signal AC, torque instruction values TR1, 2, and motor rotation numbers MRN 1, 2 from external ECU. Signal AC is composed of H level or L level. Signal AC of H level is a signal requesting generation of commercial-power-source-AC-voltage VAC, and signal AC of L level is a signal not requesting generation of commercial-power-source-AC-voltage VAC. Signal IG is composed of H level or L level. Signal IG of H level is a signal indicating that the hybrid vehicle equipped with motive power outputting apparatus 100 is activated, and signal IG of L level is a signal indicating that the hybrid car equipped with motive power outputting apparatus 100 is stopped.

When control unit 90 receives signal IG of H level and subsequently receives signal AC of L level, it determines that generation of commercial-power-source-AC-voltage VAC is not requested while the hybrid vehicle is driven, and it generates a control signal CTL0 and outputs it to inverter PWM signal conversion unit 92.

When control unit 90 receives signal IG of L level and subsequently receives signal AC of H level, it determines that generation of commercial-power-source-AC-voltage VAC is requested when the hybrid vehicle is stopped, and it generates a control signal CTL1 and outputs it to inverter PWM signal conversion unit 92.

When control unit 90 receives signal IG of H level and subsequently receives signal AC of H level, it determines whether motor generators MG1, MG2 are in the regenerative mode or in the powering mode based on torque instruction values TR1, 2 and motor rotation number MRN1, 2.

Specifically, in a Cartesian coordinates where abscissa indicates motor rotation number and ordinate indicates torque instruction value, when the relationship between motor rotation number MRN1 and torque instruction value TR1 is in the first or second quadrant, motor generator MG1 is in the powering mode. When the relationship between motor rotation number MRN1 and torque instruction value TR1 is in the third or fourth quadrant, motor generator MG1 is in the regenerative mode. Therefore, control unit 90 determines whether motor generator MG1 is in the powering mode or in the regenerative mode by the fact in which first to fourth quadrant the relationship between motor rotation number MRN1 and torque instruction value TR1 is present. Similarly, control unit 90 determines whether motor generator MG2 is in the powering mode or in the regenerative mode by the fact in which first to fourth quadrant the relationship between motor rotation number MRN2 and torque instruction value TR2 is present.

When control unit 90 determines that motor generator MG1 (or MG2) is in the powering mode, it determines that generation of commercial-power-source-AC-voltage VAC is requested while motor generator MG1 (or MG2) is in the powering mode, and it generates a control signal CTL2 and outputs it to inverter PWM signal conversion unit 92.

When control unit 90 determines that motor generator MG1 (or MG2) is in the regenerative mode, it determines that generation of commercial-power-source-AC-voltage VAC is requested while motor generator MG1 (or MG2) is in the regenerative mode, and it generates a control signal CTL3 and outputs it to inverter PWM signal conversion unit 92.

Motor control phase voltage calculation unit 91 receives output voltage Vm of boost converter 20, i.e., input voltage to inverters 30, 40, from voltage sensor 13, receives motor current MCRT1 (or MCRT2) flowing through each phase of motor generator MG1 (or MG2) from current sensor 14 (or current sensor 15), and receives torque instruction value TR1 (or torque instruction value TR2) from external ECU. Then, motor control phase voltage calculation unit 91 calculates the voltage to be applied to the coil of each phase of motor generator MG1 (or MG2) based on those inputted signals, and supplies thus calculated result to inverter PWM signal conversion unit 92.

Receiving control signal CTL0 from control unit 90, inverter PWM signal conversion unit 92 generates signal PWM1_0 (one type of signal PWM1) (or signal PWM2_0 (one type of signal PWM2)) that practically turns on/off each NPN transistor Q3-Q8 (or Q9-Q14) of inverter 30 (or 40) based on the calculation result received from motor control phase voltage calculation unit 91, and outputs thus generated signal PWM1_0 (or PWM2_0) to each NPN transistor Q3-Q8 (or Q9-Q14) of inverter 30 (or 40).

Thus, each NPN transistor Q3-Q8 (or Q9-Q14) is switching-controlled, and controls the current passing through each phase of motor generator MG1 (or MG2) such that motor generator MG1 (or MG2) produces the torque as instructed. Thus, motor driving current is controlled, and motor torque corresponding to torque instruction value TR1 (or TQ2) is output.

Further, receiving control signal CTL1 from control unit 90, inverter PWM signal conversion unit 92 generates signal PWM1_1 (one type of signal PWM1) (or signal PWM2_1 (one type of signal PWM2)) that turns on/off NPN transistors Q3-Q8 (or Q9-Q14) at 60 Hz to allow in-phase AC currents to pass through U-phase arm 31 (or 41), V-phase arm 32 (or 42) or W-phase arm 33 (or 43) of inverter 30 (or 40) based on the calculation result received from motor control phase voltage calculation unit 91, and outputs thus generated signal to NPN transistors Q3-Q8 (or Q9-Q14) of inverter 30 (or 40).

Still further, receiving control signal CTL2 from control unit 90, inverter PWM signal conversion unit 92 generates signal PWM1_2 (one type of signal PWM1) (or signal PWM2_2 (one type of signal PWM2)) that turns on/off each NPN transistor Q3-Q8 (or Q9-Q14) of inverter 30 (or 40) while changing the duty for switching-control at 60 Hz based on the calculation result received from motor control phase voltage calculation unit 91, and outputs thus generated signal to NPN transistors Q3-Q8 (or Q9-Q14) of inverter 30 (or 40).

Still further, receiving control signal CTL3 from control unit 90, inverter PWM signal conversion unit 92 generates signal PWM1_3 (one type of signal PWM1) (or signal PWM2_3 (one type of signal PWM2)) that turns on/off each NPN transistor Q3-Q8 (or Q9-Q14) of inverter 30 (or 40) such that motor generator MG1 (or MG2) generates AC voltage of 60 Hz based on the calculation result received from motor control phase voltage calculation unit 91, and outputs thus generated signal to NPN transistors Q3-Q8 (or Q9-Q14) of inverter 30 (or 40).

Figure 5:
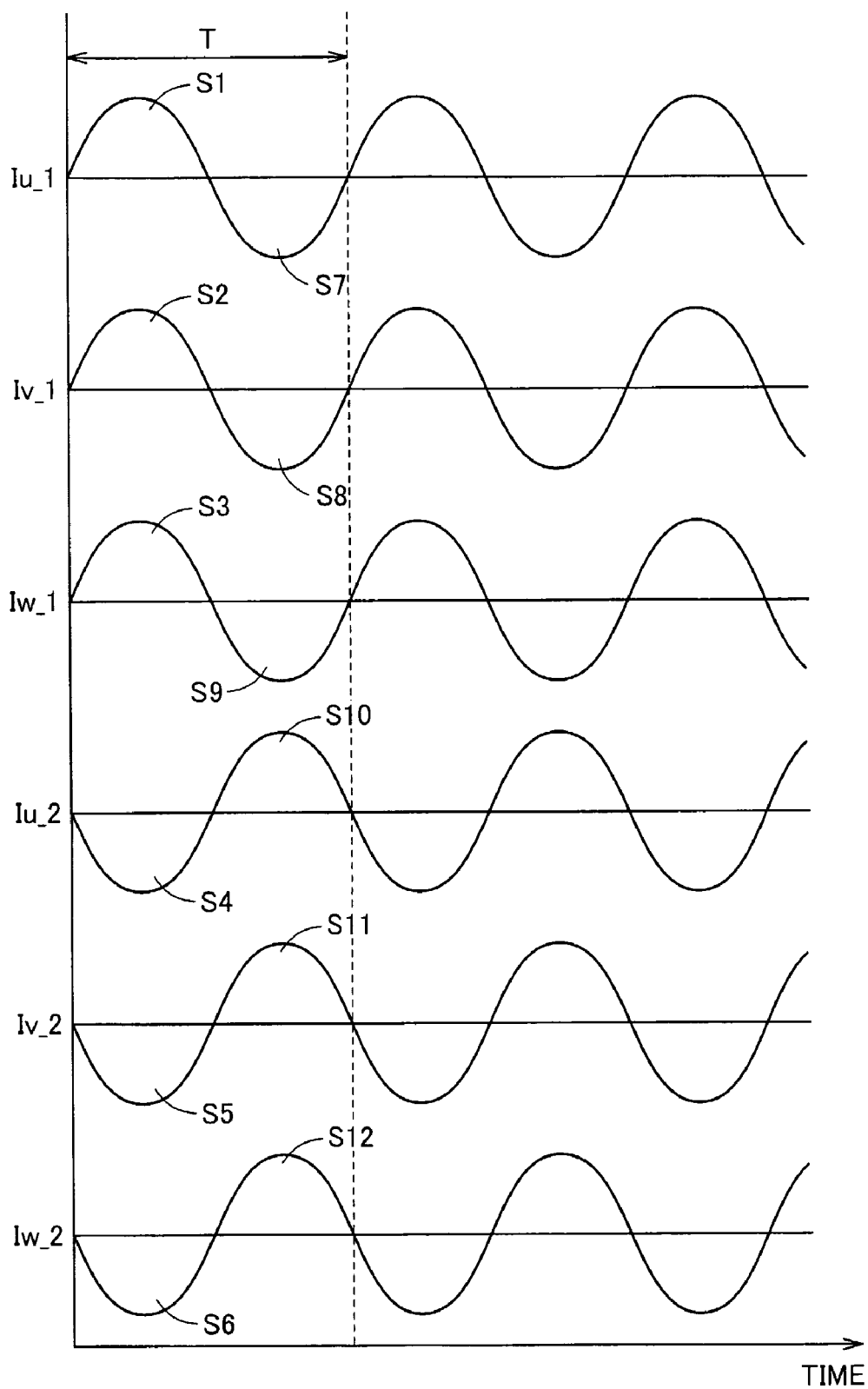
FIG. 5 is a timing chart of AC currents allowed to pass through three-phase coils of motor generators shown in FIG. 1.

Now, a method for generating commercial-power-source-AC-voltage VAC in motive power outputting apparatus 100 will be described. FIG. 5 is a timing chart of AC currents allowed to pass through three-phase coil 11, 12 of motor generator MG1, MG2 shown in FIG. 1.

First, a method for generating commercial-power-source-AC-voltage VAC when a hybrid vehicle equipped with motive power outputting apparatus 100 is stopped will be described. In this case, U-phase arm 31, V-phase arm 32, and W-phase arm 33 of inverter 30 are switching-controlled to allow in-phase AC currents to pass through U-phase coil, V-phase coil, and W-phase coil of three-phase coil 11. U-phase arm 41, V-phase arm 42, and W-phase arm 43 of inverter 40 are switching-controlled to allow in-phase AC currents, the phases of which are inverted relative to the phases of the AC currents passing through U-phase coil, V-phase coil, and W-phase coil of three-phase coil 11, to pass through U-phase coil, V-phase coil, and W-phase coil of three-phase coil 12.

Specifically, AC currents Iu_1, Iv_1 and Iw_1 shown in FIG. 5 are allowed to pass through U-phase coil, V-phase coil, and W-phase coil of three-phase coil 11, while AC currents Iu_2, Iv_2 and Iw_2 are allowed to pass through U-phase coil, V-phase coil, and W-phase coil of three-phase coil 12. AC currents Iu_1, Iv_1 and Iw_1 as well as AC currents Iu_2, Iv_2 and Iw_2 are AC currents of 60 Hz.

When allowing AC currents Iu_1, Iv_1 and Iw_1 to pass through U-phase coil, V-phase coil, and W-phase coil of three-phase coil 11, NPN transistors Q3, Q5 and Q7 are turned on/off at the frequency of 60 Hz, while NPN transistors Q4, Q6 and Q8 are turned off/on at the frequency of 60 Hz. When allowing AC currents Iu_2, Iv_2 and Iw_2 to pass through U-phase coil, V-phase coil, and W-phase coil of three-phase coil 12, NPN transistors Q9, Q11 and Q13 are turned off/on at the frequency of 60 Hz, while NPN transistors Q10, Q12 and Q14 are turned on/off at the frequency of 60 Hz.

During a period of one cycle T of AC currents Iu_1, Iv_1 and Iw_1 AC currents Iu_2, Iv_2 and Iw_2, when components S1, S2 and S3 of Iu_1, Iv_1 and Iw_1 pass through U-phase coil, V-phase coil, and W-phase coil of three-phase coil 11, components S4, S5 and S6 of AC current Iu_2, Iv_2 and Iw_2 pass through U-phase coil, V-phase coil, and W-phase coil of three-phase coil 12. Accordingly, in this case, in inverter 30, NPN transistors Q3, Q5 and Q7 are turned on, and NPN transistors Q4, Q6 and Q8 are turned off. In inverter 40, NPN transistors Q9, Q11 and Q13 are turned off, and NPN transistors Q10, Q12 and Q14 are turned on.

Next, when components S7, S8 and S9 of Iu_1, Iv_1 and Iw_1 pass through U-phase coil, V-phase coil, and W-phase coil of three-phase coil 11, components S10, S11 and S12 of AC current Iu_2, Iv_2 and Iw_2 pass through U-phase coil, V-phase coil, and W-phase coil of three-phase coil 12. Accordingly, in this case, in inverter 30, NPN transistors Q3, Q5 and Q7 are turned off, and NPN transistors Q4, Q6 and Q8 are turned on. In inverter 40, NPN transistors Q9, Q11 and Q13 are turned on, and NPN transistors Q10, Q12 and Q14 are turned off.

Thus, NPN transistors Q3, Q5 and Q7 of inverter 30 are simultaneously turned on and off for every half cycle during the period of one cycle T, NPN transistors Q4, Q6 and Q8 are simultaneously turned off and on for every half cycle during the period of one cycle T, NPN transistors Q9, Q11 and Q13 of inverter 40 are simultaneously turned off and on for every half cycle during the period of one cycle T, and NPN transistors Q10, Q12 and Q14 are simultaneously turned on and off for every half cycle during the period of one cycle T.

In the first half cycle of one cycle T, a current flows from each phase coil of three-phase coil 11 and neutral point M1 to neutral point M2 of three-phase coil 12 via transformer 50. The current then flows from neutral point M2 to NPN transistors Q10, Q12 and Q14 via each phase coil of three-phase coil 12. In the second half cycle of one cycle T, a current flows from each phase coil of three-phase coil 12 and neutral point M2 to neutral point M1 of three-phase coil 11 via transformer 50. The current then flows from neutral point M1 to NPN transistors Q4, Q6 and Q8 via each phase coil of three-phase coil 11.

Thus, the current switching its direction for every half cycle of one cycle T, i.e., an AC current, flows between neutral point M1 of three-phase coil 11 and neutral point M2 of three-phase coil 12. The frequency at which the current switches is 60 Hz. As a result, an AC voltage is generated between opposing ends of primary coil 51 of transformer 50. Transformer 50 converts the AC voltage generated between opposing ends of primary coil 51 to commercial-power-source-AC-voltage VAC in accordance with turns ratio of primary coil 51 and secondary coil 52, and outputs it from terminals 61, 62.

Here, as in-phase AC currents flow through three-phase coils 11, 12, motor generators MG1, MG2 do not output torque.

It should be noted that, while it has been described that all of NPN transistors Q3, Q5 and Q7 and all of NPN transistors Q4, Q6 and Q8 of inverter 30 are turned on/off, and all of NPN transistors Q9, Q11 and Q13 and all of NPN transistors Q10, Q12 and Q14 of inverter 40 are turned on/off to allow in-phase AC currents to pass through each of three-phase coils 11, 12, the present invention is not limited thereto. At least one of NPN transistors Q3, Q5 and Q7 and at least one of NPN transistors Q4, Q6 and Q8 of inverter 30 may be turned on/off, and at least one of NPN transistors Q9, Q11 and Q13 and at least one of NPN transistors Q10, Q12 and Q14 of inverter 40 are turned on/off to allow in-phase AC currents to pass through each of three-phase coils 11, 12.

Figure 6:
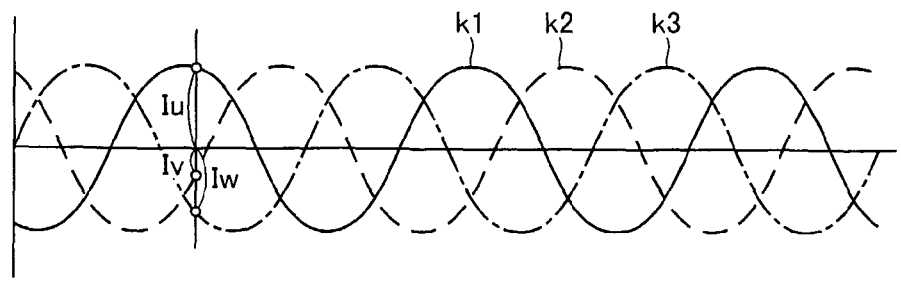
FIG. 6 is a waveform diagram of currents passing through a U-phase coil, a V-phase coil and a W-phase coil of the three-phase coil of the motor generator.
Figure 7:
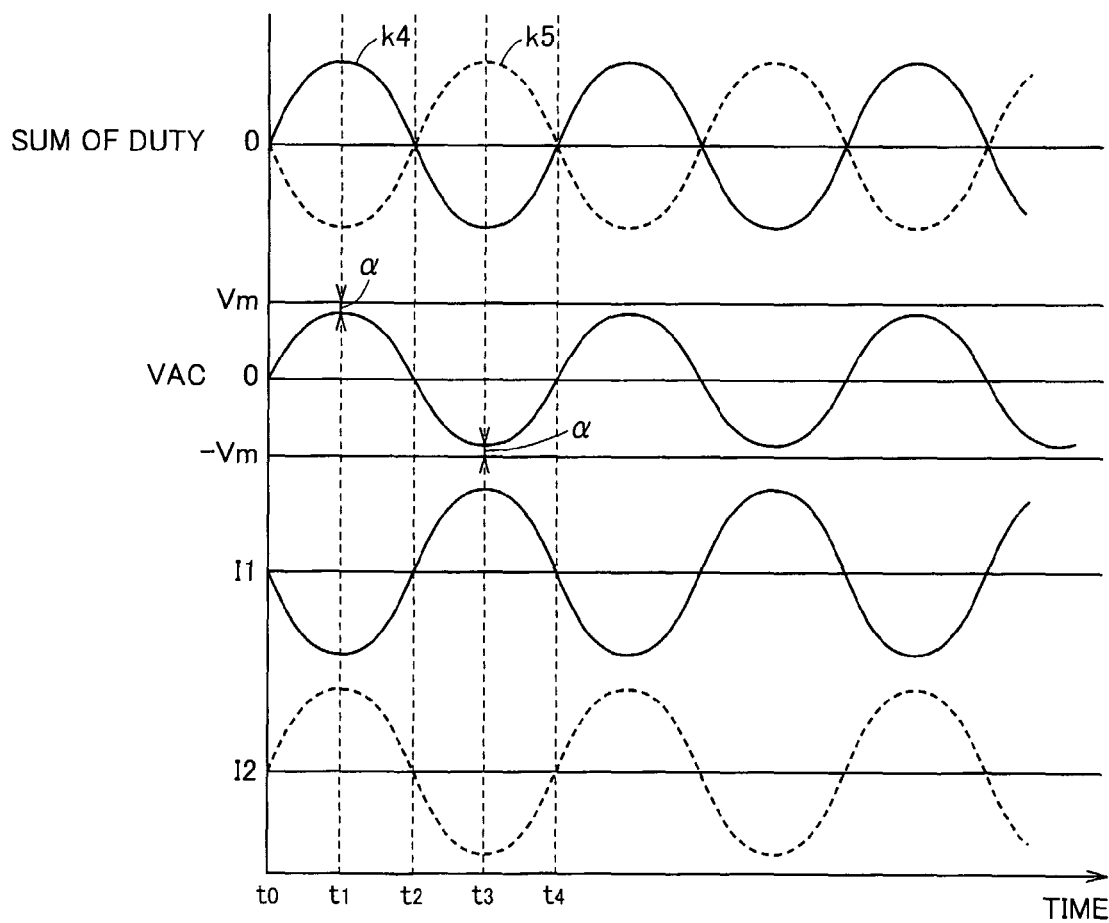
FIG. 7 is a waveform diagram of the sum of duty, an AC voltage, and an AC current.

Next, a method for generating commercial-power-source-AC-voltage VAC when a hybrid vehicle equipped with motive power outputting apparatus 100 is running will be described. FIG. 6 is a waveform diagram of the currents passing through U-phase coil, V-phase coil and W-phase coil of three-phase coils 11, 12 of motor generators MG1, MG2. FIG. 7 is a waveform diagram of the sum of duty, an AC voltage, and an AC current.

When both of motor generators MG1, MG2 are in the powering mode, currents Iu, Iv, and Iw that changes according to the curves k1, k2, and k3 shown in FIG. 6, flow through U-phase coil, V-phase coil and W-phase coil of three-phase coils 11, 12, respectively.

Now, consider the case where current Iu passing through U-phase coil is equal to the sum of current Iv passing through V-phase coil and current Iw passing through W-phase coil. Specifically, consider the case where the following equation is satisfied:

$$Iu = Iv + Iw \qquad (1)$$

In this state, NPN transistors Q3, Q6 and Q8 are turned on, and NPN transistors Q4, Q5 and Q7 of inverter 30 are turned off. Assume that duty for switching controlling U-phase arm 31 is 50%, duty for switching controlling V-phase arm 32 is 10%, and duty for switching controlling W-phase arm 33 is 40%.

Then, current Iu in the left side of equation (1) flows with duty of 50%, while currents Iv+Iw in the right side of equation (1) flow with duty of 50% (=10%+40%). As a result, the duty when current Iu flows becomes equal to the duty when currents Iv +Iw flow, and the potential of neutral point M1 becomes voltage Vm/2, which is half the voltage Vm applied to inverter 30.

In this state, when duty of V-phase arm 32 is reduced from 10% to 5%, then current Iu flows with duty of 50%, while currents Iv+Iw flow with duty of 45% (=5% +40%). As a result, the duty when currents Iv+Iw flow becomes smaller than the duty when current Iu flows, and the potential of neutral point M1 becomes lower than voltage Vm/2.

On the other hand, when duty of V-phase arm 32 is increased from 10% to 15%, then current Iu flows with duty of 50%, while currents Iv+Iw flow with duty of 55% (=15%+40%). As a result, the duty when currents Iv+Iw flow becomes greater than the duty when current Iu flows, and the potential of neutral point M1 becomes higher than voltage Vm/2.

Thus, the potential of neutral point M1 raises and lowers relative to voltage Vm/2, depending on the relative magnitude between the duty when the upper arm (NPN transistor Q3) of inverter 30 is turned on and the duty when the lower arm (NPN transistors Q6, Q8) of inverter 30 is turned on. Specifically, given that the duty turning the upper arm of inverter 30 on is DUTY1 and the duty turning the lower arm of inverter 30 on is DUTY2, then when DUTY1>DUTY2, the potential of neutral point M1 becomes lower than Vm/2, and when DUTY1<DUTY2, the potential of neutral point M1 becomes higher than Vm/2. The potential of neutral point M1 becomes the lowest when DUTY2 becomes minimum, and the potential of neutral point M1 becomes the highest when DUTY2 becomes maximum.

Accordingly, the potential of neutral point M1 can be controlled to be raised and lowered relative to voltage Vm/2, by changing the value of duty DUTY2 of the lower arm to duty DUTY1 of the upper arm of inverter 30.

The potential of neutral point M2 of motor generator MG2 can also be controlled to be raised and lowered relative to voltage Vm/2, by changing the value of duty DUTY4 of the lower arm to duty DUTY3 of the upper arm of inverter 40.

Accordingly, in the present invention, when both of motor generators MG1, MG2 are in the powering mode, the duty for switching-control inverters 30, 40 is changed according to respective curves k4, k5 shown in FIG. 7. Curve k5 has a phase that is inverted relative to the phase of curve k4. In FIG. 7, curve k4 indicates changes in the sum of duty for switching-controlling inverter 30, while curve k5 indicates changes in the sum of duty for switching-controlling inverter 40.

It should be noted that the sum of duty is obtained by subtracting the duty of upper arm from the duty of the lower arm in each inverter. Accordingly, DUTY2-DUTY1 is the sum of duty in inverter 30, and DUTY4-DUTY3 is the sum of duty in inverter 40.

In FIG. 7, the upper half of the sum relative to the zero line indicates that the potentials of neutral points M1, M2 become higher than voltage Vm/2, while the lower half of the sum relative to the zero line indicates that the potentials of neutral points M1, M2 become lower than voltage Vm/2.

In FIG. 7, the frequency at which the sum of duty changes is 60 Hz.

In the present invention, the sum of duty of inverter 30 is changed cyclically at the frequency of 60 Hz according to curve k4, while the sum of duty of inverter 40 is changed cyclically at the frequency of 60 Hz according to curve k5. Specifically, the sum of duty of inverter 30 is changed cyclically with the phase that is inverted relative to the phase with which the sum of duty of inverter 30 is changed.

As a result, at timing t0, as the sum of duty is zero for each of inverter 30, 40 (i.e., the duty of the upper arm is equal to the duty of the lower arm), the potentials of neutral points M1, M2 are both equal to voltage Vm/2, and AC voltage VAC outputted from transformer 50 is 0V.

From timing t0 to timing t1, the potential of neutral point M1 becomes higher than voltage Vm/2 and the potential of neutral point M2 becomes lower than voltage Vm/2, and therefore AC voltage VAC outputted from transformer 50 increases and becomes maximum at timing t1. AC voltage VAC at timing t1 is lower than voltage Vm by αV, since the duty of the upper arm in each inverter 30, 40 is always lower than 100%.

Thereafter, from timing t1 to timing t2, the potential of neutral point M1 gradually decreases from the maximum value, while the potential of neutral point M2 gradually increases from the minimum value, AC voltage VAC outputted from transformer 50 decreases and attains 0V at timing t2.

Further, from timing t2 to timing t3, the potential of neutral point M1 becomes lower than voltage Vm/2, while the potential of neutral point M2 becomes higher than voltage Vm/2, the polarity of AC voltage VAC outputted from transformer 50 is inverted from that between timing t0 and timing t2, and AC voltage VAC increases towards the minus side, becoming maximum on the minus side at timing t3. Thereafter, between timing t3 and timing t4, the potential of neutral point M1 gradually increases from the minimum value, and the potential of neutral point M2 gradually decreases from the maximum value. Therefore, AC voltage VAC outputted from transformer 50 decreases from the maximum value on the minus side, attaining 0V at timing t4.

In this case, from timing t0 to timing t2, in inverter 40, as the duty for turning the lower arm on is smaller than the duty for turning the upper arm on, the current flowing from the upper arm of inverter 40 to neutral point M2 of three-phase coil 12 becomes greater than the current flowing from neutral point M2 to the lower arm of inverter 40. Additionally, in inverter 30, as the duty for turning the lower arm on is greater than the duty for turning the upper arm on, the current flowing from the upper arm of inverter 30 to neutral point M1 of three-phase coil 11 becomes smaller than the current flowing from neutral point M1 to the lower arm of inverter 30. Further, as shown in curves k4, k5 in FIG. 7, in inverters 30, 40, the difference between the duty of the upper arm and that of the lower arm are the same in absolute value and opposite in polarity.

Then, in three-phase coil 12, among the current flowing from the upper arm of inverter 40 to neutral point M2, the redundant current that cannot flow into the lower arm of inverter 40 from neutral point M2 then flows from neutral point M2 to neutral point M1 of three-phase coil 11 via primary coil 51 of transformer 50, and further to the lower arm of inverter 30 from neutral point M1.

Specifically, between timing t0 and timing t2, negative current I1 flows through inverter 30, and positive current I2 flows through inverter 40.

Additionally, from timing t2 to timing t4, in inverter 30, as the duty for turning the lower arm on is smaller than the duty for turning the upper arm on, the current flowing from the upper arm of inverter 30 to neutral point M1 of three-phase coil 11 becomes greater than the current flowing from neutral point M1 to the lower arm of inverter 30. Additionally, in inverter 40, as the duty for turning the lower arm on is greater than the duty for turning the upper arm on, the current flowing from the upper arm of inverter 40 to neutral point M2 of three-phase coil 12 becomes smaller than the current flowing from neutral point M2 to the lower arm of inverter 40. Further, as shown in curves k4, k5 in FIG. 7, in inverters 30, 40, the difference between the duty of the upper arm and that of the lower arm are the same in absolute value and opposite in polarity.

Then, in three-phase coil 11, among the current flowing from the upper arm of inverter 30 to neutral point M1, the redundant current that cannot flow into the lower arm of inverter 30 from neutral point M1 then flows from neutral point M1 to neutral point M2 of three-phase coil 12 via primary coil 51 of transformer 50, and further to the lower arm of inverter 40 from neutral point M2.

Specifically, between timing t2 and timing t4, positive current I1 flows through inverter 30, and negative current I2 flows through inverter 40.

Thus, when generating commercial-power-source-AC-voltage VAC in the powering mode of motor generators MG1, MG2 also, AC currents having inverted phase relative to each other flows through inverters 30, 40.

Figure 8:
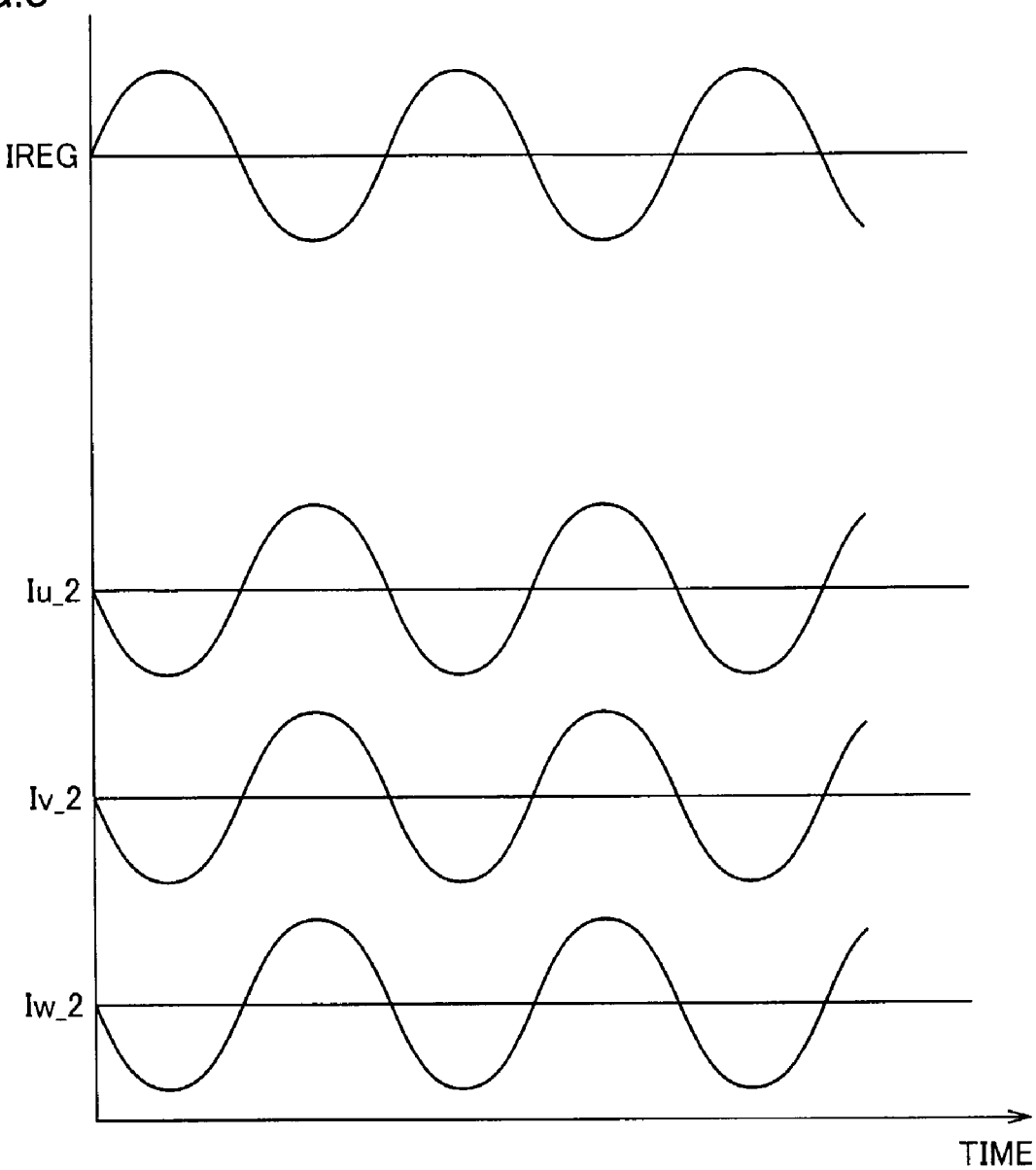
FIG. 8 is a timing chart of AC currents.

Finally, a method for generating commercial-power-source-AC-voltage VAC when motor generator MG1 is in the regenerative mode and motor generator MG2 is in the powering mode will be described. FIG. 8 is a timing chart of AC currents.

In this case, inverter 30 drives motor generator MG1 in the regenerative mode. Accordingly, motor generator MG1 supplies inverter 30 with a regenerative current IREG shown in FIG. 8. Then, inverter 40 allows in-phase AC currents Iu_2, Iv_2, and IW_2, the phases of which are inverted relative to the phase of the regenerative current IREG, to flow through U-phase coil, V-phase coil, and W-phase coil of three-phase coil 12, respectively. Therefore, motor generator MG2 does not output torque.

Thus, transformer 50 converts the AC voltage generated between the opposing ends of primary coil 51 to commercial-power-source-AC-voltage VAC, and outputs it from terminals 61, 62.

When motor generator MG1 is in the powering mode and motor generator MG2 is in the regenerative mode also, AC voltage VAC can be generated by the same operation as described above.

Thus, when generating commercial-power-source-AC-voltage VAC while one of motor generators MG1, MG2 is in the regenerative mode and the other is in the powering mode, AC currents having an inverted phase relative to each other flows through inverters 30, 40.

It should be noted that, while it has been described that all of NPN transistors Q9, Q11 and Q13 and all of NPN transistors Q10, Q12 and Q14 of inverter 40 are turned on/off to allow in-phase AC currents to pass through each three-phase coil 12, the present invention is not limited thereto. At least one of NPN transistors Q9, Q11 and Q13 and at least one of NPN transistors Q10, Q12 and Q14 of inverter 40 are turned on/off to allow in-phase AC currents to pass through each three-phase coil 12.

As described above, motive power outputting apparatus 100 can generate commercial-power-source-AC-voltage VAC when motor generators MG1, MG2 are stopped and are driving. When generating AC voltage VAC while motor generators MG1, MG2 are stopped and when generating AC voltage VAC while one of motor generators MG1, MG2 is in the regenerative mode, the frequency of AC voltage VAC is determined by the frequency for switching-controlling NPN transistors Q3-Q8, Q9-Q14 included in inverters 30, 40 (i.e., the frequency for switching-control U-phase arms 31, 41, V-phase arms 32, 42 and W-phase arms 33, 43 in inverters 30, 40). Accordingly, by selecting the frequency for switching-controlling NPN transistors Q3-Q8, Q9-Q14, the frequency of AC voltage VAC can arbitrarily be set. In other words, motive power outputting apparatus 100 can generate AC voltage VAC having any frequency.

Additionally, when motive power outputting apparatus 100 generates AC voltage VAC while motor generators MG1, MG2 are in the powering mode, the frequency of AC voltage VAC is determined by the frequency at which the duty for switching-controlling NPN transistors Q3-Q8, Q9-Q14 included in inverters 30, 40 is changed. Accordingly, by selecting the frequency at which the duty for switching-controlling NPN transistors Q3-Q8, Q9-Q14 is changed, the frequency of AC voltage VAC can arbitrarily be set. In other words, motive power outputting apparatus 100 can generate AC voltage VAC having any frequency.

Thus, motive power outputting apparatus 100 can generate AC voltage VAC having any frequency, irrespective of the driving state of motor generators MG1, MG2.

Additionally, by selecting the turns ratio of primary coil 51 and secondary coil 52 of transformer 50, transformer 50 can output AC voltage VAC having any frequency from terminals 61, 62.

Further, as AC voltage VAC is generated using inverters 30, 40 for driving motor generators MG1, MG2, a dedicated inverter for obtaining AC voltage VAC is not required.

Still further, generation of AC voltage VAC can be shared by two inverters 30, 40.

The present invention is characterized in that, when motor generators MG1, MG2 are stopped or one of motor generators MG1, MG2 is in the regenerative mode, the frequency of commercial-power-source-AC-voltage VAC is determined by the frequency at which NPN transistors Q3-Q8, Q9-Q14 are switching-controlled. The frequency at which NPN transistors Q3-Q8, Q9-Q14 are switching-controlled can arbitrarily be set irrespective of the frequency at which NPN transistors Q3-Q8, Q9-Q14 are switching-controlled when motive power outputting apparatus 100 outputs prescribed torque from motor generators MG1, MG2.

The present invention is characterized in that, when motor generators MG1, MG2 are in the powering mode, the frequency of commercial-power-source-AC-voltage VAC is determined by the frequency at which the duty for switching-controlling NPN transistors Q3-Q8, Q9-Q14 is changed. The frequency at which the duty for switching-controlling NPN transistors Q3-Q8, Q9-Q14 is changed can arbitrarily be set irrespective of the frequency at which NPN transistors Q3-Q8, Q9-Q14 are switching-controlled when motive power outputting apparatus 100 outputs prescribed torque from motor generators MG1, MG2.

Figure 9:
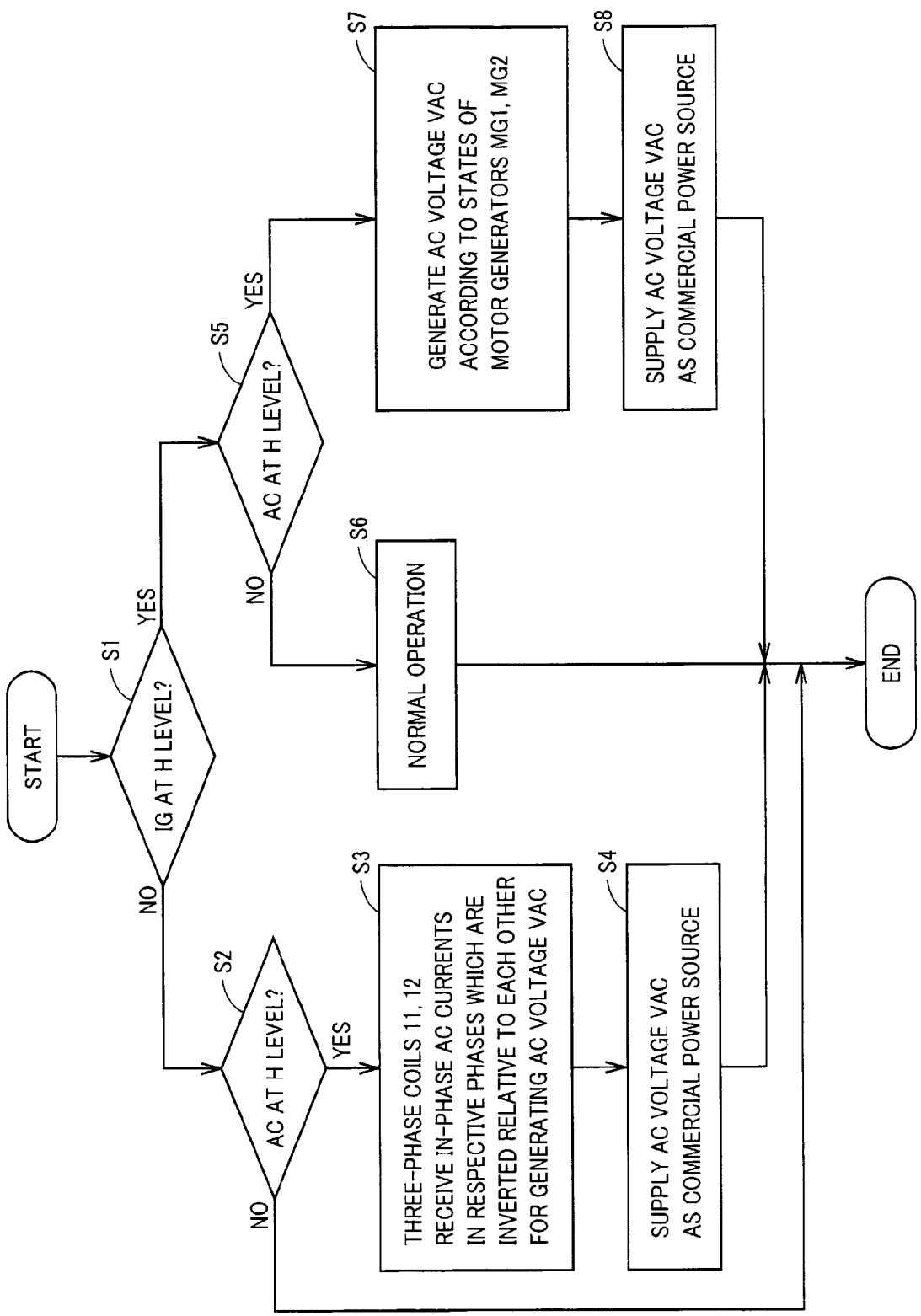
FIG. 9 is a flowchart for describing an operation of the motive power outputting apparatus shown in FIG. 1.

FIG. 9 is a flowchart for describing the operation of motive power outputting apparatus 100 shown in FIG. 1. Referring to FIG. 9, when a series of operation is started, whether signal IG from the ignition key is at H level or not is determined (step S1). When it is determined that signal IG is not at H level at step S1, i.e., when it is determined that the hybrid vehicle equipped with motive power outputting apparatus 100 is stopped, whether signal AC is at H level or not is further determined (step S2). At step S2, when it is determined that signal AC is not at H level, the series of operation ends.

On the other hand, when it is determined that signal AC is at H level at step S2, then it is recognized that generation of commercial-power-source-AC-voltage VAC is requested while the hybrid vehicle is stopped. Then, converter control means 71 generates signal PWC according to the method described above and outputs it to boost converter 20. Boost converter 20 boosts battery voltage Vb according to signal PWC, and supplies capacitor C2 with output voltage Vm.

Control unit 90 of inverter control means 72, 73 generates control signal CTL1 and outputs it to inverter PWM signal conversion unit 92. Motor control phase voltage calculation unit 91 calculates the voltage to be applied to each phase of inverters 30, 40 according to the operation described above, and outputs it to inverter PWM signal conversion unit 92. Inverter PWM signal conversion unit 92 generates signals PWM1_1, PWM2_1 for allowing in-phase AC currents to pass through U-phase coil, V-phase coil and W-phase coil of three-phase coils 11, 12 based on the calculation result received from motor control phase voltage calculation unit 91, and outputs thus generated signals to respective inverters 30, 40.

In this case, signal PWM1_1 is a signal for allowing AC currents Iu_1, Iv_1 and Iw_1 shown in FIG. 5 to pass through U-phase coil, V-phase coil, and W-phase coil of three-phase coil 11, while signal PWM2_1 is a signal for allowing AC currents Iu_2, Iv_2 and Iw_2 shown in FIG. 5 to pass through U-phase coil, V-phase coil, and W-phase coil of three-phase coil 12.

Thus, based on the electric power accumulated in capacitor C2, inverter 30 allows currents Iu_1, Iv_1 and Iw_1 to pass through U-phase coil, V-phase coil, and W-phase coil of three-phase coil 11, respectively, and inverter 40 allows currents Iu_2, Iv_2 and Iw_2 to pass through U-phase coil, V-phase coil, and W-phase coil of three-phase coil 12, respectively. In other words, three-phase coils 11, 12 receive in-phase AC currents in respective phases which are inverted relative to each other, and transformer 50 converts the AC voltage generated between opposing ends of primary coil 51 and outputs commercial-power-source-AC-voltage VAC from terminals 61, 62 (step S3).

AC voltage VAC outputted from terminals 61, 62 is supplied to electric appliances for outdoors, or supplied as a home emergency power source (step S4).

At step S1, when it is determined that signal IG is at H level, whether signal AC is at H level or not is further determined (step S5). When it is determined that signal AC is not at H level, a normal operation is performed (step S6).

Specifically, control unit 90 of inverter control means 72, 73 generates control signal CTL0 and outputs it to inverter PWM signal conversion unit 92. Motor control phase voltage calculation unit 91 of inverter control means 72, 73 calculates the voltage to be applied to each phase of inverters 30, 40 according to the operation described above and outputs it to inverter PWM signal conversion unit 92. In accordance with control signal CTL0 from control unit 90, inverter PWM signal conversion unit 92 of inverter control means 72 generates signal PWM1_0 (one type of signal PWM1) that practically turns on/off each NPN transistor Q3-Q8 of inverter 30 based on the calculation result received from motor control phase voltage calculation unit 91, and outputs thus generated signal PWM1_0 to each NPN transistor Q3-Q8 of inverter 30.

In accordance with control signal CTL0 from control unit 90, inverter PWM signal conversion unit 92 of inverter control means 73 generates signal PWM2_0 (one type of signal PWM2) that practically turns on/off each NPN transistor Q9-Q14 of inverter 40 based on the calculation result received from motor control phase voltage calculation unit 91, and outputs thus generated signal PWM2_0 to each NPN transistor Q9-Q14 of inverter 40.

Thus, inverter 30 converts the DC voltage from capacitor C2 to an AC voltage based on signal PWM1_0 and drives motor generator MG1. Inverter 40 converts the DC voltage from capacitor C2 to an AC voltage based on signal PWM2_0 and drives motor generator MG2. Then, motive power outputting apparatus 100 drives the hybrid vehicle.

On the other hand, when it is determined that signal AC is at H level at step S5, then AC voltage VAC is generated in accordance with the operation mode of motor generators MG1, MG2 (step S7).

Specifically, control unit 90 of inverter control means 72 determines the operation mode of motor generator MG1 based on torque instruction value TR1 and motor rotation number MRN1, and control unit 90 of inverter control means 73 determines the operation mode of motor generator MG2 based on torque instruction value TR2 and motor rotation number MRN2. Control unit 90 of inverter control means 72, when motor generator MG1 is in the powering mode, generates control signal CTL2 and outputs it to inverter PWM signal conversion unit 92. Control unit 90 of inverter control means 73, when motor generator MG2 is in the powering mode, generates control signal CTL2 and outputs it to inverter PWM signal conversion unit 92.

Motor control phase voltage calculation unit 91 of inverter control means 72, 73 calculates the voltage to be applied to each phase of inverters 30, 40 according to the operation described above, and outputs it to inverter PWM signal conversion unit 92. In accordance with control signal CTL2 from control unit 90, inverter PWM signal conversion unit 92 of inverter control means 72 generates signal PWM1_2 for switching-controlling each phase arm of inverter 30 by changing the duty at 60 Hz according to curve k4 shown in FIG. 7 based on the calculation result received from motor control phase voltage calculation unit 91, and outputs thus generated signal to inverter 30. Additionally, in accordance with control signal CTL2 from control unit 90, inverter PWM signal conversion unit 92 of inverter control means 73 generates signal PWM2_2 for switching-controlling each phase arm of inverter 40 by changing the duty at 60 Hz according to curve k5 shown in FIG. 7 based on the calculation result received from motor control phase voltage calculation unit 91, and outputs thus generated signal to inverter 40.

Thus, NPN transistors Q3-Q8 of inverter 30 are switching-controlled with the duty that is changed according to curve k4 in accordance with signal PWM1_2, while NPN transistors Q9-Q14 of inverter 40 are switching-controlled with the duty that is changed according to curve k5 in accordance with signal PWM2_2. As described above, the potentials of neutral points M1, M2 are each changed relative to voltage Vm/2 cyclically, and transformer 50 converts the AC voltage generated in primary coil 51 and outputs commercial-power-source-AC-voltage VAC from terminals 61, 62.

When motor generator MG1 is in the regenerative mode and motor generator MG2 is in the powering mode, control unit 90 of inverter control means 72 generates a control signal CTL3 and outputs it to inverter PWM signal conversion unit 92. Control unit 90 of inverter control means 73 generates control signal CTL1 and outputs it to inverter PWM signal conversion unit 92.

Then, motor control phase voltage calculation unit 91 of inverter control means 72 calculates the voltage to be applied to each phase of inverters 30 according to the operation described above, and outputs it to inverter PWM signal conversion unit 92. Inverter PWM signal conversion unit 92, in accordance with control signal CTL3 from control unit 90, generates signal PWM1_3 for controlling inverter 30 in the regenerative mode based on the calculation result from motor control phase voltage calculation unit 91, and outputs it to inverter 30.

Motor control phase voltage calculation unit 91 of inverter control means 73 calculates the voltage to be applied to each phase of inverters 40 according to the operation described above, and outputs it to inverter PWM signal conversion unit 92. Inverter PWM signal conversion unit 92, in accordance with control signal CTL3 from control unit 90, generates signal PWM2_1 for allowing in-phase AC currents to pass through U-phase coil, V-phase coil and W-phase coil of three-phase coil 12 based on the calculation result from motor control phase voltage calculation unit 91, and outputs it to inverter 40.

Then, inverter 30, in accordance with signal PWM1_3, drives motor generator MG1 to supply inverter 30 with a regenerative current IREG shown in FIG. 8. Inverter 40, in accordance with signal PWM2_1, allows currents Iu_2, Iv_2, and Iw_2 shown in FIG. 8 to pass through U-phase coil, V-phase coil, and W-phase coil of three-phase coil 12. Transformer 50 converts the AC voltage generated between the opposing ends of primary coil 51 and outputs commercial-power-source-AC-voltage VAC from terminals 61, 62.

Then, the electric appliance mounted on the hybrid vehicle is driven by AC voltage VAC from terminals 61, 62 (step S8). After any of steps S4, S6 and S8, the series of operation ends.

As described above, motive power outputting apparatus 100 generates commercial-power-source-AC-voltage VAC when the hybrid vehicle is either driven or stopped, and supplies the generated AC voltage VAC to electric devices or home from terminals 61, 62.

Figure 10:
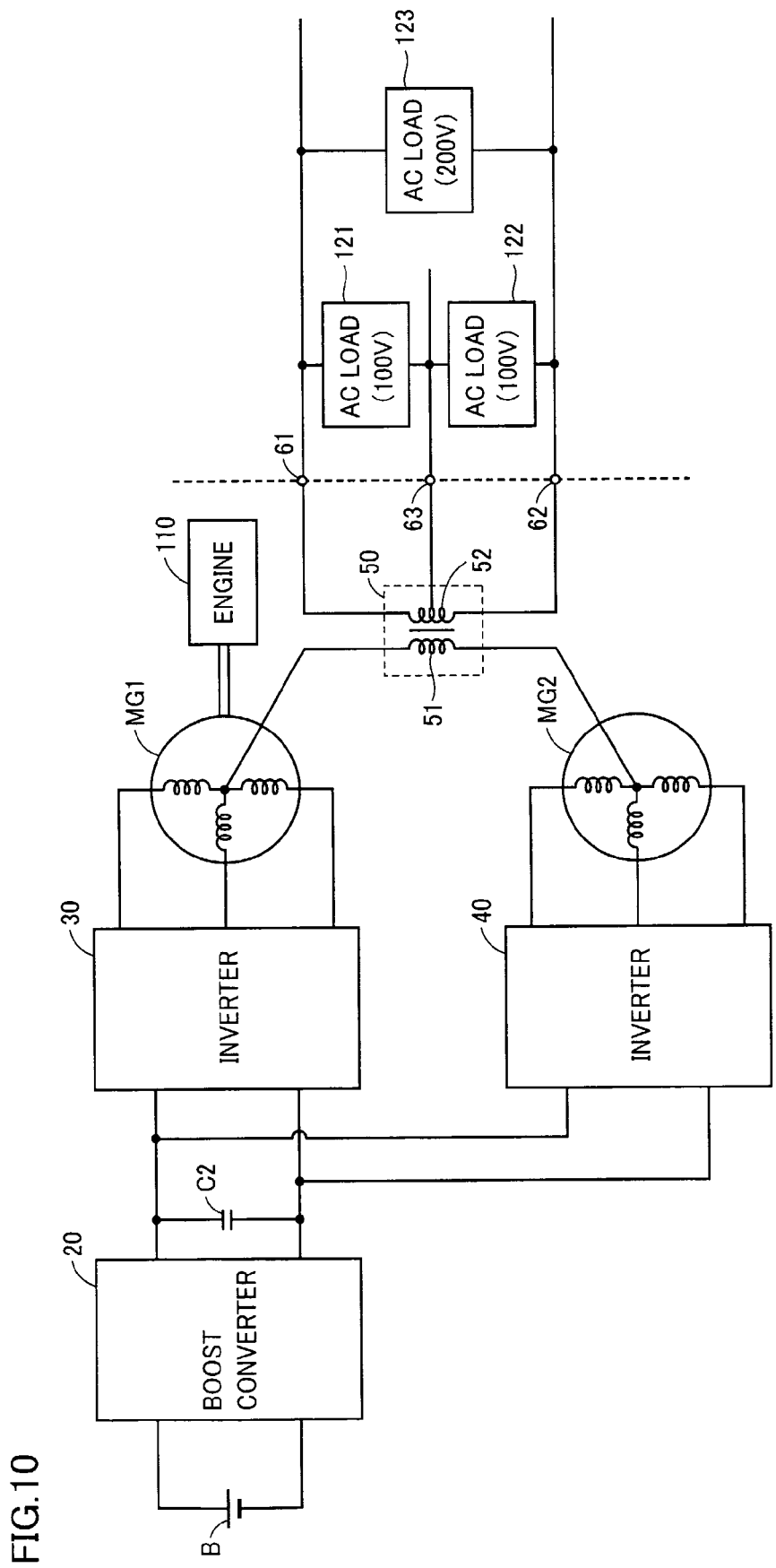
FIG. 10 is a schematic block diagram of the motive power outputting apparatus shown in FIG. 1 in more detail as applied to a hybrid vehicle.

FIG. 10 is a schematic block diagram of motive power outputting apparatus 100 shown in FIG. 1 in more detail as applied to a hybrid vehicle. In FIG. 10, motor generator MG1 is coupled to engine 110. Motor generator MG1 starts engine 110 and also generates electricity by the rotation force from engine 110.

In FIG. 10, motive power outputting apparatus 100 includes a terminal 63 in addition to terminals 61, 62. Transformer 50 supplies an AC voltage of 200V between terminals 61-62, and supplies an AC voltage of 100V between terminals 61-63 and between terminals 63-62.

An AC load 121 is connected between terminals 61 and 63, an AC load 122 is connected between terminals 63 and 62, and an AC load 123 is connected between terminals 61 and 62. Accordingly, AC load 121 is driven receiving the AC voltage of 100V from terminals 61, 63, AC load 122 is driven receiving the AC voltage of 100V from terminals 63, 62, and AC load 123 is driven receiving the AC voltage of 200V from terminals 61, 62.

It should be noted that, while it has been described that motive power outputting apparatus 100 is mounted on a hybrid vehicle, the present invention is not limited thereto and motive power outputting apparatus 100 can be mounted on an electric vehicle or on a fuel cell vehicle. The present invention is applicable to the one that generally uses two motor generators. When motive power outputting apparatus 100 is mounted on an electric vehicle or on a fuel cell vehicle, motor generators MG1, MG2 are coupled to driving wheels of the electric vehicle or the fuel cell vehicle.

Three-phase coils 11, 12, inverters 30, 40, control apparatus 70 and transformer 50 constitute "an AC voltage generating apparatus" according to the present invention. "The AC voltage generating apparatus" according to the present invention is not limited to the one generating AC voltage VAC using three-phase coils 11, 12 of motor generators MG1, MG2 mounted on a vehicle, and it may be the one generating AC voltage VAC using three-phase coils of two motor generators for the use except for a vehicle.

Further, inverter 30 and inverter control means 72 constitute "a first current supplying circuit".

Still further, inverter 40 and inverter control means 73 constitute "a second current supplying circuit".

INDUSTRIAL APPLICABILITY

The present invention is applicable to an AC voltage generating apparatus generating an AC voltage using two three-phase coils, or to a motive power outputting apparatus generating an AC voltage using two three-phase coils.

The invention claimed is:

1. An AC voltage generating apparatus, comprising:
   first and second three-phase coils (11, 12);
   a first current supplying circuit allowing a first AC current having a prescribed frequency to pass through said first three-phase coil;
   a second current supplying circuit allowing a second AC current having said prescribed frequency and a phase being inverted relative to a phase of said first AC current to pass through said second three-phase coil; and
   a voltage converter (50) connected between a first neutral point (M1) of said first three-phase coil (11) and a second neutral point (M2) of said second three-phase coil (12) for converting an AC voltage generated between said first neutral point (M1) and said second neutral point (M2) to output an AC voltage having said prescribed frequency.

2. The AC voltage generating apparatus according to claim 1, wherein
   said first current supplying circuit includes
   a first inverter (30) connected to said first three-phase coil (11), and
   first control means (72) for controlling said first inverter (30) to allow said first AC current to pass through said first three-phase coil (11), and wherein
   said second current supplying circuit includes
   a second inverter (40) connected to said second three-phase coil (12), and
   second control means (73) for controlling said second inverter (40) to allow said second AC current to pass through said second three-phase coil (12).

3. The AC voltage generating apparatus according to claim 2, wherein
   said prescribed frequency is determined by a switching frequency in said first and second inverters (30, 40).

4. The AC voltage generating apparatus according to claim 3, wherein
   said first three-phase coil (11) is formed of first to third coils,
   said second three-phase coil (12) is formed of fourth to sixth coils,
   said first inverter (30) includes first to third arms (31, 32, 33) provided corresponding to said first to third coils,
   said second inverter (40) includes fourth to sixth arms (41, 42, 43) provided corresponding to said fourth to sixth coils,
   said first control means (72) switching-controls at least one of said first to third arms (31, 32, 33) at said prescribed frequency to allow a first in-phase AC current to pass through at least one of said first to third coils, and said second control means (73) switching-controls at least one of said fourth to sixth arms (41, 42, 43) at said prescribed frequency to allow a second in-phase AC current having a phase being inverted relative to a phase of said first in-phase AC current to pass through at least one of said fourth to sixth coils.

5. The AC voltage generating apparatus according to claim 3, wherein
said first three-phase coil (11) is formed of first to third coils,
said second three-phase coil (12) is formed of fourth to sixth coils,
said first inverter (30) includes first to third arms (31, 32, 33) provided corresponding to said first to third coils,
said second inverter (40) includes fourth to sixth arms (41, 42, 43) provided corresponding to said fourth to sixth coils,
said first control means (72) controls said first inverter (30) to convert an AC voltage generated by said first to third coils to a DC voltage,
said second control means (73) switching-controls at least one of said fourth to sixth arms (41, 42, 43) to allow an in-phase AC current having a phase being inverted relative to a phase of an AC current generated by said first to third coils to pass through at least one of said fourth to sixth coils.

6. The AC voltage generating apparatus according to claim 2, wherein
said prescribed frequency is determined by a frequency at which a duty for switching-controlling said first and second inverters (30, 40) is changed.

7. The AC voltage generating apparatus according to claim 6, wherein
said first three-phase coil (11) is formed of first to third coils,
said second three-phase coil (12) is formed of fourth to sixth coils,
said first inverter (30) includes first to third arms (31, 32, 33) provided corresponding to said first to third coils,
said second inverter (40) includes fourth to sixth arms (41, 42, 43) provided corresponding to said fourth to sixth coils,
said first control means (72) switching-controls said first to third arms (31, 32, 33) by changing a first duty of said first to third arms (31, 32, 33) according to a first curve that changes at said prescribed frequency, and
said second control means (73) switching-controls said fourth to sixth arms (41, 42, 43) by changing a second duty of said fourth to sixth arms (41, 42, 43) according to a second curve that has a phase being inverted relative to a phase of said first curve.

8. A motive power outputting apparatus, comprising:
a first motor generator (MG1) including a first three-phase coil (11) as a stator coil;
a second motor generator (MG2) including a second three-phase coil (12) as a
a first inverter (30) connected to said first three-phase coil (11);
a second inverter (40) connected to said second three-phase coil (12);
first control means (72) for controlling said first inverter (30) to allow a first AC current having a prescribed frequency to pass through said first three-phase coil (11);
second control means (73) for controlling said second inverter (40) to allow a second AC current having a phase being inverted relative to a phase of said first AC current to pass through said second three-phase coil (12); and
a voltage converter (50) connected between a first neutral point (M1) of said first three-phase coil (11) and a second neutral point (M2) of said second three-phase coil (12) for converting an AC voltage generated between said first neutral point (M1) and said second neutral point (M2) to output an AC voltage having said prescribed frequency.

9. The motive power outputting apparatus according to claim 8, wherein
said prescribed frequency is determined by a switching frequency in said first and second inverters (30, 40).

10. The motive power outputting apparatus according to claim 9, wherein
said first three-phase coil (11) is formed of first to third coils,
said second three-phase coil (12) is formed of fourth to sixth coils,
said first inverter (30) includes first to third arms (31, 32, 33) provided corresponding to said first to third coils,
said second inverter (40) includes fourth to sixth arms (41, 42, 43) provided corresponding to said fourth to sixth coils,
when said first and second motor generators (MG1, MG2) are stopped,
said first control means (72) switching-controls at least one of said first to third arms (31, 32, 33) at said prescribed frequency to allow a first in-phase AC current to pass through at least one of said first to third coils, and
said second control means (73) switching-controls at least one of said fourth to sixth arms (41, 42, 43) at said prescribed frequency to allow a second in-phase AC current having a phase being inverted relative to a phase of said first in-phase AC current to pass through at least one of said fourth to sixth coils.

11. The motive power outputting apparatus according to claim 9, wherein
said first three-phase coil (11) is formed of first to third coils,
said second three-phase coil (12) is formed of fourth to sixth coils,
said first inverter (30) includes first to third arms (31, 32, 33) provided corresponding to said first to third coils,
said second inverter (40) includes fourth to sixth arms (41, 42, 43) provided corresponding to said fourth to sixth coils,
in a regenerative mode of said first motor generator (MG1),
said first control means (72) controls said first inverter (30) to convert an AC voltage generated by said first to third coils to a DC voltage, and
said second control means (73) switching-controls at least one of said fourth to sixth arms (41, 42, 43) to allow an in-phase AC current having a phase being inverted relative to a phase of an AC current generated by said first to third coils to pass through at least one of said fourth to sixth coils.

12. The motive power outputting apparatus according to claim 8, wherein
said prescribed frequency is determined by a frequency at which a duty for switching-controlling said first and second inverters (30, 40) is changed.

13. The motive power outputting apparatus according to claim 12, wherein said first three-phase coil (11) is formed of first to third coils, said second three-phase coil (12) is formed of fourth to sixth coils, said first inverter (30) includes first to third arms (31, 32, 33) provided corresponding to said first to third coils said second inverter (40) includes fourth to sixth arms (41, 42, 43) provided corresponding to said fourth to sixth coils, in a powering mode of said first and second motor generators (MG1, MG2), said first control means (72) switching-controls said first to third arms (31, 32, 33) by changing a first duty of said first to third arms (31, 32, 33) according to a first curve that changes at said prescribed frequency, and said second control means (73) switching-controls said fourth to sixth arms (41, 42, 43) by changing a second duty of said fourth to sixth arms (41, 42, 43) according to a second curve that has a phase being inverted relative to a phase of said first curve.

14. The motive power outputting apparatus according to claim 13, wherein said first motor generator (MG1) is coupled to an internal combustion engine of a vehicle, and said second motor generator (MG2) is coupled to a driving wheel of said vehicle.

15. The motive power outputting apparatus according to claim 13, wherein each of said first and second motor generators (MG1, MG2) is coupled to a driving wheel of a vehicle.

* * * * *